US007300208B2

(12) United States Patent
Kuellstaedt et al.

(10) Patent No.: US 7,300,208 B2
(45) Date of Patent: Nov. 27, 2007

(54) LINEAR GUIDE UNIT AND METHOD FOR MANUFACTURING THE SAME

(75) Inventors: Wolfgang Kuellstaedt, Grafenrheinfeld (DE); Richard Kuehnlein, Graefendorf (DE); Thomas Wahler, Bergrheinfeld (DE); Roland Greubel, Ramsthal (DE); German Duetsch, Schweinfurt (DE); Werner Keller, Schwemmelsbach (DE); Stefan Dorn, Arnstein (DE); Steven Worcester, Niederwerrn (DE); Werner Blaurock, Niederwerrn (DE)

(73) Assignee: Rexroth Star GmbH, Schweinfurt (DE)

( * ) Notice: Subject to any disclaimer, the term of this patent is extended or adjusted under 35 U.S.C. 154(b) by 119 days.

(21) Appl. No.: 11/107,681

(22) Filed: Apr. 15, 2005

(65) Prior Publication Data

US 2005/0232521 A1   Oct. 20, 2005

(30) Foreign Application Priority Data

Apr. 19, 2004  (DE) ................ 10 2004 018 820

(51) Int. Cl.
*F16C 29/06* (2006.01)
(52) U.S. Cl. .......................... 384/43; 384/45
(58) Field of Classification Search ............ 384/45, 384/49, 43, 44; 464/168
See application file for complete search history.

(56) References Cited

U.S. PATENT DOCUMENTS

| | | |
|---|---|---|
| 1,500,116 A | 7/1924 | Dowd |
| 3,900,233 A | 8/1975 | Thomson |
| 4,635,331 A | 1/1987 | Walter et al. |
| 5,217,308 A | 6/1993 | Schroeder |
| 5,289,779 A | 3/1994 | Ohya et al. |
| 5,800,065 A * | 9/1998 | Lyon ........................... 384/45 |
| 5,930,898 A | 8/1999 | Lyon |
| 6,484,599 B2 | 11/2002 | Blaurock |
| 6,508,589 B2 | 1/2003 | Kashiwagi et al. |
| 2001/0012417 A1 | 8/2001 | Kashiwagi et al. |

FOREIGN PATENT DOCUMENTS

| | | |
|---|---|---|
| DE | 1 222 322 | 8/1966 |
| DE | 35 04 061 A1 | 8/1986 |
| DE | 44 28 558 A1 | 2/1996 |
| DE | 100 03 619 A1 | 8/2001 |
| EP | 0 258 714 A1 | 3/1988 |
| EP | 0 353 396 A1 | 2/1990 |
| EP | 0 213 160 | 9/1992 |
| WO | 86/04651 | 8/1986 |

\* cited by examiner

*Primary Examiner*—William C Joyce
(74) *Attorney, Agent, or Firm*—Michael J. Striker

(57) ABSTRACT

A guide rail (12) of a linear guide unit (10) is provided with at least one running rail (16), which has at least two races (16a) that have different load transmission directions. According to the present invention, the running rail (16) is attached to the guide rail (12) by means of roller insertion; in the surface sections (12a) associated with the races (16a) of the running rail (16), the guide rail (12) is provided with a plurality supporting ribs (12a1); and the supporting ribs (12a1) associated with one and the same race (16a) are aligned essentially parallel to the load transmission direction (B) of this race (16a). In addition or alternatively, in a section (12d) that is not intrinsically deformed by the roller insertion of the at least one running rail (16), the guide rail (12) has at least one additional rolled section. The present invention also relates to a method for manufacturing guide rails of this kind (12).

15 Claims, 4 Drawing Sheets

LINEAR GUIDE UNIT AND METHOD FOR MANUFACTURING THE SAME

BACKGROUND OF THE INVENTION

The invention relates to a linear guide unit that has a guide rail extending in a longitudinal direction, and a guide carriage that is guided on the guide rail in the longitudinal direction; the guide rail has at least one running rail, which is equipped with at least two races that have different load transmission directions and are separated from each other by a load-free surface segment.

A linear guide unit of this kind is known, for example, from U.S. Pat. No. 5,800,065. In the linear guide unit disclosed therein, the running rails are positioned in lateral recesses of the guide rail that have been previously cut into the guide rail by means of cutting machining, e.g. milling, in order to be able to assure the required degree of precision fit. This cutting machining increases the complexity of manufacturing the linear guide unit and consequently increases the manufacturing costs of the linear guide unit significantly. Although only the balls of a single recirculating ball element travel in the running rail, the running rail has two races with different load transmission directions. The roller elements contact the running rail in two different regions of the running rail that are separated from each other by a load-free surface segment. Together with a correspondingly embodied running rail contained in the guide carriage, this consequently produces a so-called four-point contact of the balls.

Reference is also made to U.S. Pat. No. 5,217,308, DE 100 03 619 A1, and U.S. Pat. No. 1,500,166.

EP 0 213 160 A1 and DE 44 28 558 A1 have essentially disclosed attaching a running rail to a guide rail by means of roller insertion. To this end, a surface section of the guide rail associated with the running rail is provided with a plurality of supporting ribs, which are deformed during the roller insertion and thus permit a precise relative positioning of the running rail and guide rail. The advancing direction of the roller insertion tool extends essentially in the protrusion direction of the supporting ribs, which in turn protrude essentially in the operating load transmission direction. This makes it possible to prevent the supporting ribs from bending away laterally during the roller insertion.

SUMMARY OF THE INVENTION

An object of the present invention is to produce a linear guide unit of the type mentioned at the beginning, which can be manufactured more simply and less expensively.

This object is attained according to the present invention by a linear guide unit of the type mentioned at the beginning in which the guide rail is comprised of a softer material, the running rail is comprised of a harder material, and the running rail is attached to the guide rail by means of roller insertion; in which the guide rail is provided with a plurality supporting ribs in the surface sections associated with the races of the running rail; and in which the supporting ribs associated with one and the same race protrude essentially parallel to the load transmission direction of this race.

As explained above, the roller insertion of a running rail into a guide rail is intrinsically known from EP 0 213 169 A1 and DE 44 28 558 A1. In these cases, though, the running rail has only a single race because only then is it possible for the advancing direction of the roller insertion tool to essentially coincide with the protrusion direction of the supporting ribs and the operating load transmission direction. It has not previously appeared possible to use this method for running rails that have a plurality races with different operating load transmission directions since in this case, the advancing direction of the roller tool does not extend parallel to the protrusion direction of the supporting ribs and consequently, there is the danger that the supporting ribs might bend away laterally. The inventor has realized that this apparent impossibility is merely a misconception, albeit one that is commonly held by specialists in the field.

It should be noted at this point that in connection with the present invention, the longitudinal direction of the guide rail is understood to be a local parameter. In other words, the guide rail need not extend in a straight line over its entire length but can also easily contain curved sections. In these curved sections, the longitudinal direction of the guide rail then extends parallel to the tangent of the actual path of the guide rail in these curved sections. It should also be stressed that the guide carriage can be guided on the guide rail either by means of endless recirculating roller elements, e.g. recirculating balls, or by means of rolls.

While the running rail is being roller inserted into the guide rail, in order to keep the process forces acting between these two components to a minimum, in one modification of the invention, the running rail is supported against the guide rail only in the sections associated with the races.

In order to effectively support the running rail on the guide rail during operation, according to one embodiment, a race of a running rail is associated with an odd number of supporting ribs, preferably three supporting ribs. It is therefore easy to assure that the operating load line extends through the center supporting rib. In order to achieve the highest possible rigidity, is also advantageous if the center supporting rib is wider than the supporting ribs adjacent to it.

In order to be able to eliminate a cutting machining in the manufacture of the running rail as well, in another modification of the present invention, the running rail is comprised of a cold-formed, preferably cold-rolled material, preferably steel.

As is intrinsically known from the prior art, it is also preferable in the present invention for the profile of the race to have the shape of a Gothic arch. In the case in which the running rail only contacts the roller elements of a single recirculating roller element, the Gothic arch has turned out to be particularly favorable for producing a so-called four-point contact. However, the races of the running rail of the linear guide unit according to the present invention can also be respectively contacted by the roller elements of a separate recirculating roller element or by a separate guide roller.

For example, at least one tab provided on the guide rail can assure a secure fastening of the running rail to the guide rail. For example, this tab can be produced at the same time as the running rail is roller inserted into the guide rail. It is particularly easy to attach the running rail to the guide rail if a securing tab of this kind is associated with both edges of the running rail.

The guide rail can, for example, be comprised of an extrusion molded profile material made of light metal or a light metal alloy, preferably aluminum or an aluminum alloy. This makes it possible to eliminate a cutting machining of the guide rail after the extrusion molding. However, it can also be advantageous to execute a non-cutting calibration machining of the guide rail.

The deformation of the guide rail during the rolling can cause the guide rail to buckle because it becomes longer in the region deformed by the rolling but maintains its length in the rest of the non-deformed region. In order to counteract this kind of buckling, according to one modification of the invention, the guide rail has at least one additional roller-inserted section in a region that is not intrinsically deformed by the roller insertion of the at least one running rail, for example its base section. The "base section" refers to the section of the guide rail with which it rests on the mounting surface of a larger structural unit.

An undesirable buckling of the guide rail can be counteracted in a particularly effective manner if the center of gravity of the deformed cross-sectional area of the guide rail essentially coincides with the center of gravity of the overall cross-sectional area of the guide rail.

Experience has shown that the design of the running rail and supporting ribs has a decisive influence on the longevity of the guide rail. For example, cracks can form in the running rail. Another problem is that the running rail can come loose over time. This occurs as a result of micromovements of the guide rail that arise when the roller elements or guide rollers travel over it. The continuously changing deformation leads to material fatigue and in the worst case, even to fracturing of the material. It is therefore important for the support of the running rail to be as rigid as possible so as to minimize the deformation to which it is subjected. At the same time, however, it is necessary for the supporting ribs to be plastically deformed during the rolling process. In this context, it is necessary on the one hand for there to be a sufficient magnitude of deformation to permit compensation for tolerances in the blank, on the other hand, impermissibly high processing force must be prevented. It is also necessary to take into account the fact that after the roller insertion, a certain amount of elastic rebound occurs, which increases along with the rib height and decreases the precision with which the guide rail can be manufactured. Experience has shown that particularly favorable ratios can be achieved by virtue of the following:

when the guide carriage is guided on the guide rail by means of at least one endless recirculating roller element, the thickness of the running rail is between approximately 10% and approximately 35% of the roller element diameter, the ratio of the sum of the widths of the supporting ribs associated with a running rail to the overall width of the running rail lies between approximately 50% and approximately 70%;

and/or when the guide carriage is guided on the guide rail by means of at least one endless recirculating roller element, the ratio of the sum of the widths of the supporting ribs associated with a race to the diameter of the roller elements lies between approximately 30% and approximately 60%;

and/or the ratio of the height of a supporting rib to the width of the same supporting rib lies between approximately 0.5 and approximately 1.5.

The invention also relates to a method for manufacturing a linear guide unit according to the present invention, which is characterized in that a roller tool with a Gothic arch profile is used, which has a very snug fit in relation to the races. The expression "snug fit" is understood to reflect the ratio of the radius of the race to the radius of the surface of the roller insertion tool. By combining the use of a Gothic arch as the profile for the roller insertion tool and the snug fit of the roller tool in relation to the races, despite the fact that the advancing direction of the roller insertion tool does not coincide with the protrusion direction of the supporting ribs, the inventors have succeeded in preventing the supporting ribs from bending away laterally while the running rail is being roller inserted into the guide rail. Moreover, the snug fit makes it possible to reliably prevent the races from being damaged during roller insertion of the running rail.

It is also particularly advantageous if the advancing direction of the roller insertion tool encloses an angle not equal to zero with each of the load transmission directions. In the case of a running rail that has two races, it is particularly preferable if the advancing direction of the roller insertion tool encloses essentially the same angle with both of the load transmission directions since this causes the two rolling forces exerted on the races to yield a resulting overall force essentially oriented in the advancing direction.

In order to achieve a high degree of manufacturing precision, according to one embodiment, the roller insertion tool is advanced in a plurality advancing stages.

It can also be advantageous if the guide rail is pre-calibrated, preferably in a non-cutting manner, before the roller insertion of the at least one running rail.

Production time and therefore production costs can be saved if the deforming of the supporting ribs, the production of the securing tabs, and the production of the at least one additional roller-inserted section are all carried out simultaneously.

Viewed in another way, the present invention relates to a method for manufacturing a linear guide unit according to the present invention in which the guide rail, after the running rail has been roller inserted, is guided along its races and in so doing, the bottom surface of the guide rail is routed out. It is thus possible to precisely establish the position of the running rail in relation to a larger structural unit on which the bottom surface of the guide rail rests.

Naturally, protection is also claimed for the above-explained concept of providing at least one additional roller-inserted section in a region of the guide rail that is not intrinsically deformed by the roller insertion of the at least one running rail, in order to be able to prevent the roller insertion from causing the guide rail to buckle.

DETAILED DESCRIPTION OF THE PREFERRED EMBODIMENTS

Figure 1:
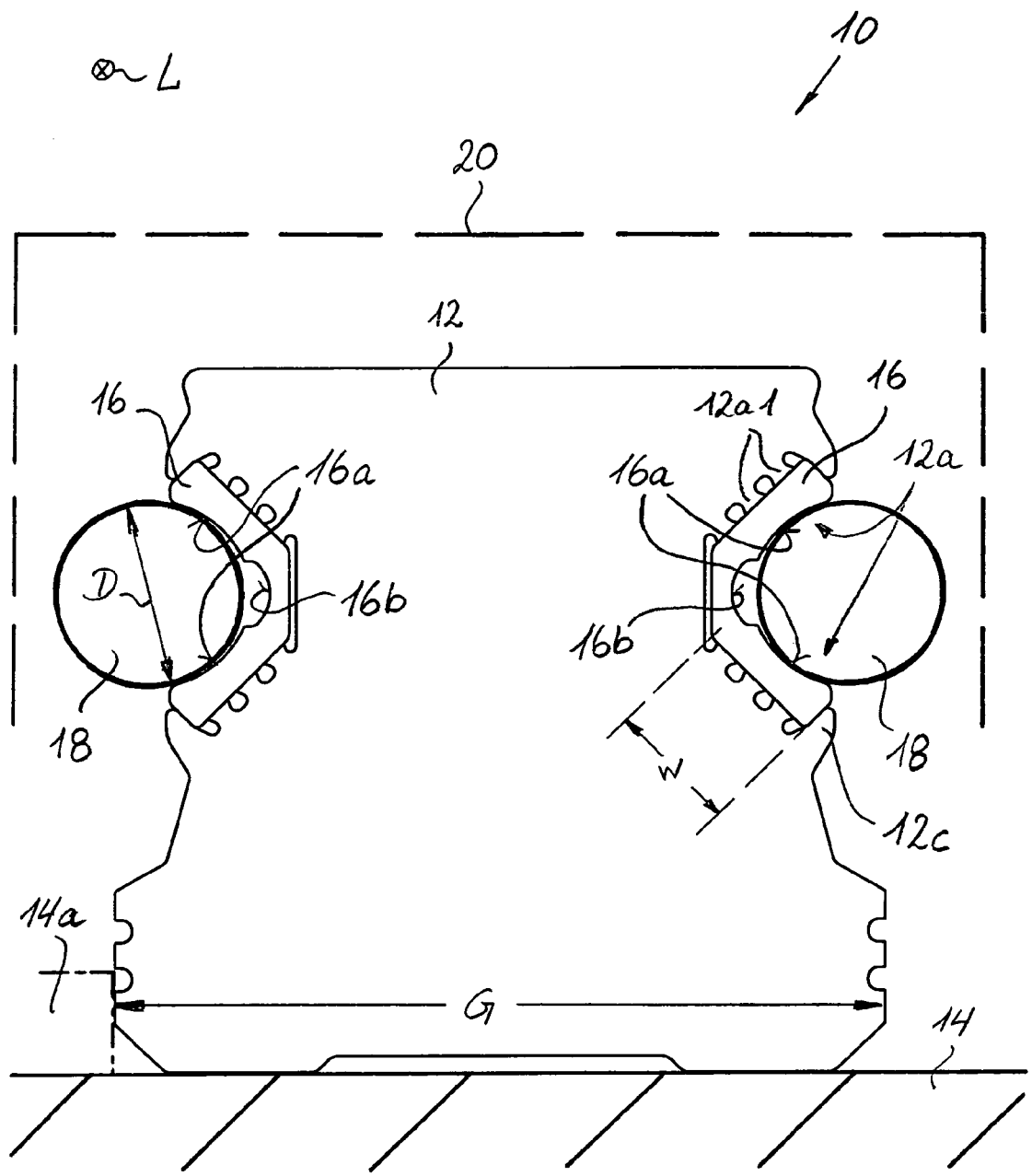
FIG. 1 shows a very schematic front view of a linear guide unit according to the present invention.

FIG. 1 shows a linear guide unit according to the present invention, which is labeled as a whole with the reference numeral 10. It has a guide rail 12 that is attached by means of fastening elements, not shown, to a larger structural unit, for example a mounting plate 14. The two side surfaces of the guide rail 12 are each provided with a running rail 16 whose surface oriented away from the guide rail 12 has two load-carrying surface sections or races 16a that are separated from each other by a load-free section 16b, i.e. a section 16b via which no forces are exchanged between the guide rail 12 and the guide carriage 20 (only depicted in schematic form by means of dashed lines in FIG. 1) during operation of the linear guide unit 10.

Figure 5:
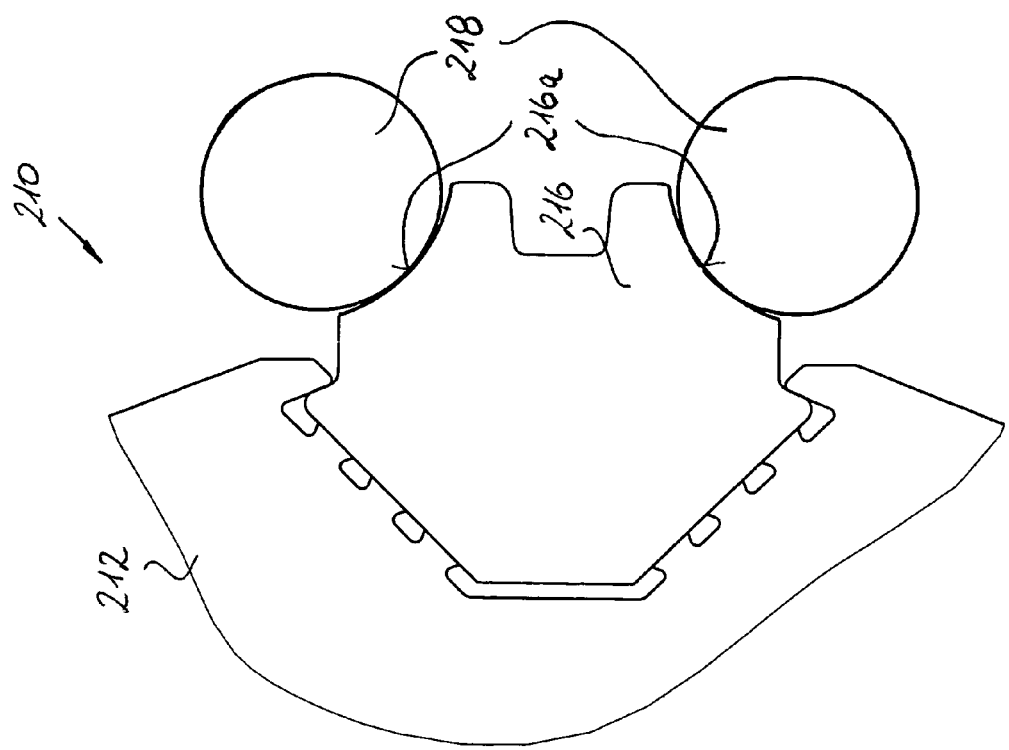
FIGS. 4 and 5 show details of the guide rails of additional linear guide units according to the present invention.
Figure 4:
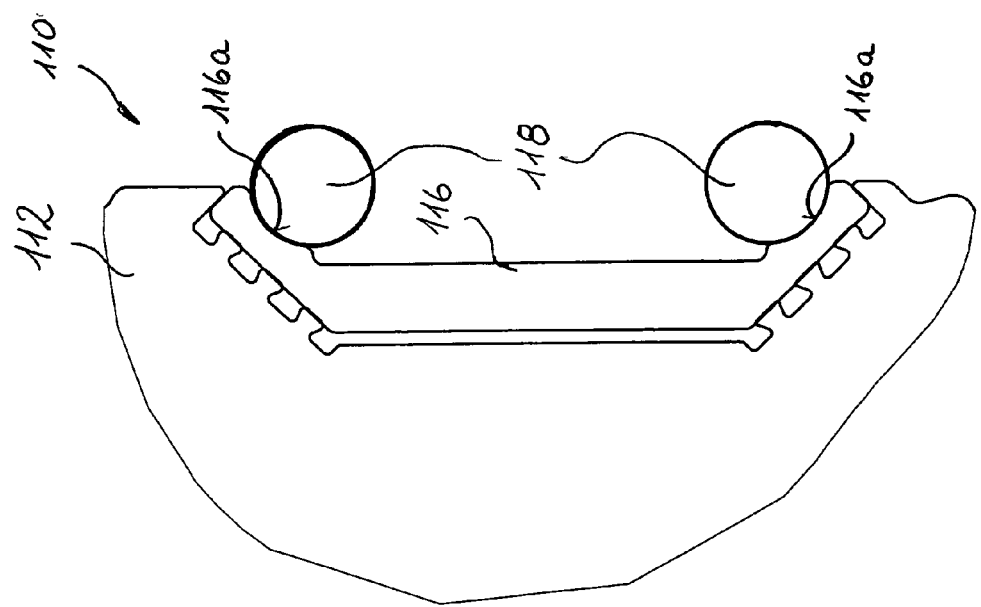

The roller elements 18 of an endless recirculating roller element, not shown in detail, of the guide carriage 20, travel in the races 16a of each running rail 16 and the guide carriage 20 is guided so that it can slide on the guide rail 12 in its longitudinal direction L. In the embodiment form according to FIG. 1, although each of the balls 18 is supported against both races 16a of the running rail 16 associated with it, it should be noted at this point that the invention can also be advantageously used in linear guide units in which each race 116a (see FIG. 4) or 216a (see FIG. 5) is associated with the rollers 118 or 218 of a separate recirculating roller element. But the embodiment forms according to FIGS. 4 and 5 do not differ from the embodiment form according to FIG. 1, which will be described in greater detail below, with regard to the details according to the present invention in relation to the fastening of the running rails 116 or 216 to the guide rail 112 or 212 of the linear guide unit 110 or 210.

It is also important to stress that the present invention can be advantageously used not only in a linear guide unit in which the guide carriage 20 is guided on the guide rail 12 by means of endless recirculating roller elements, but also in linear guide units in which the guide carriage is guided on the guide rail by means of rolls.

Figure 2:
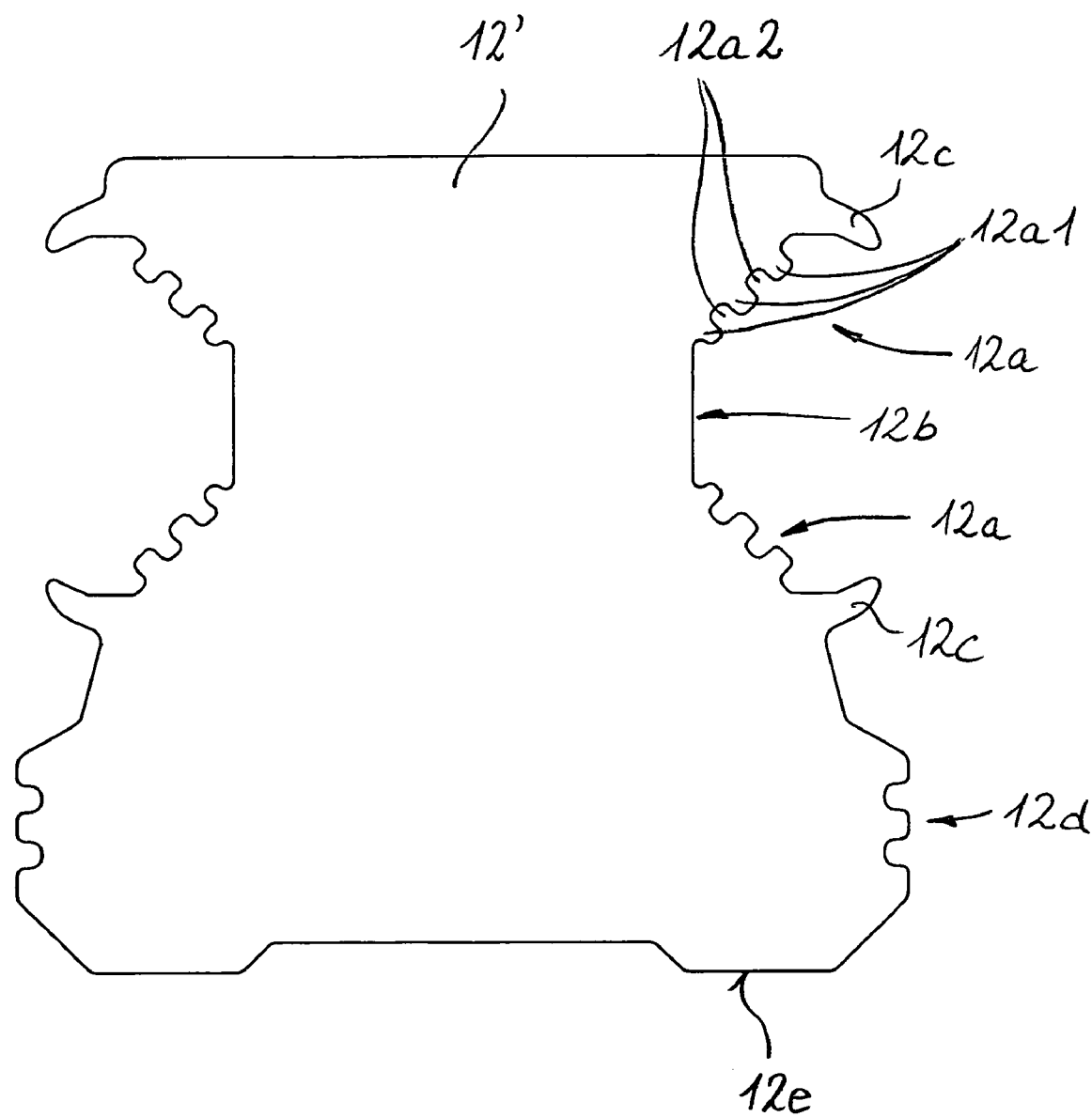
FIG. 2 is a front view of the guide rail of the linear guide unit shown in FIG. 1, in a state before the running rails are roller inserted.

According to the present invention, the manufacture of the guide rail 12 of the linear guide unit shown in FIG. 1 begins with a blank 12' of the kind depicted in FIG. 2. This blank 12' is embodied in the form of an extrusion molded profile made of a light metal or a light metal alloy, for example aluminum or an aluminum alloy, and, before further processing, can optionally be subjected to an additional, preferably non-cutting, calibration step. In the region in which the running rail 16 is mounted in the guide rail 12, the blank 12' is embodied as follows:

In the two sections in which the sections of the running rail 16 that have the races 16a are supported, the blank 12' has two regions 12a, each of which has three supporting ribs 12a1 that are separated from one another by channels 12a2. Between the two regions 12a, the blank 12' has a recess 12b that does not come into contact with the running rail 16, even in the finished guide rail 12. In addition, the upper and lower edges of the array comprised of the regions 12a and 12b are each delimited by a projection 12c, which will be discussed in greater detail further below. Finally, mention should also be made of the regions 12d that are disposed close to or adjoining the bottom surface 12e of the blank and are likewise provided with ribs and channels. These regions 12d will be discussed in greater detail further below.

Figure 3:
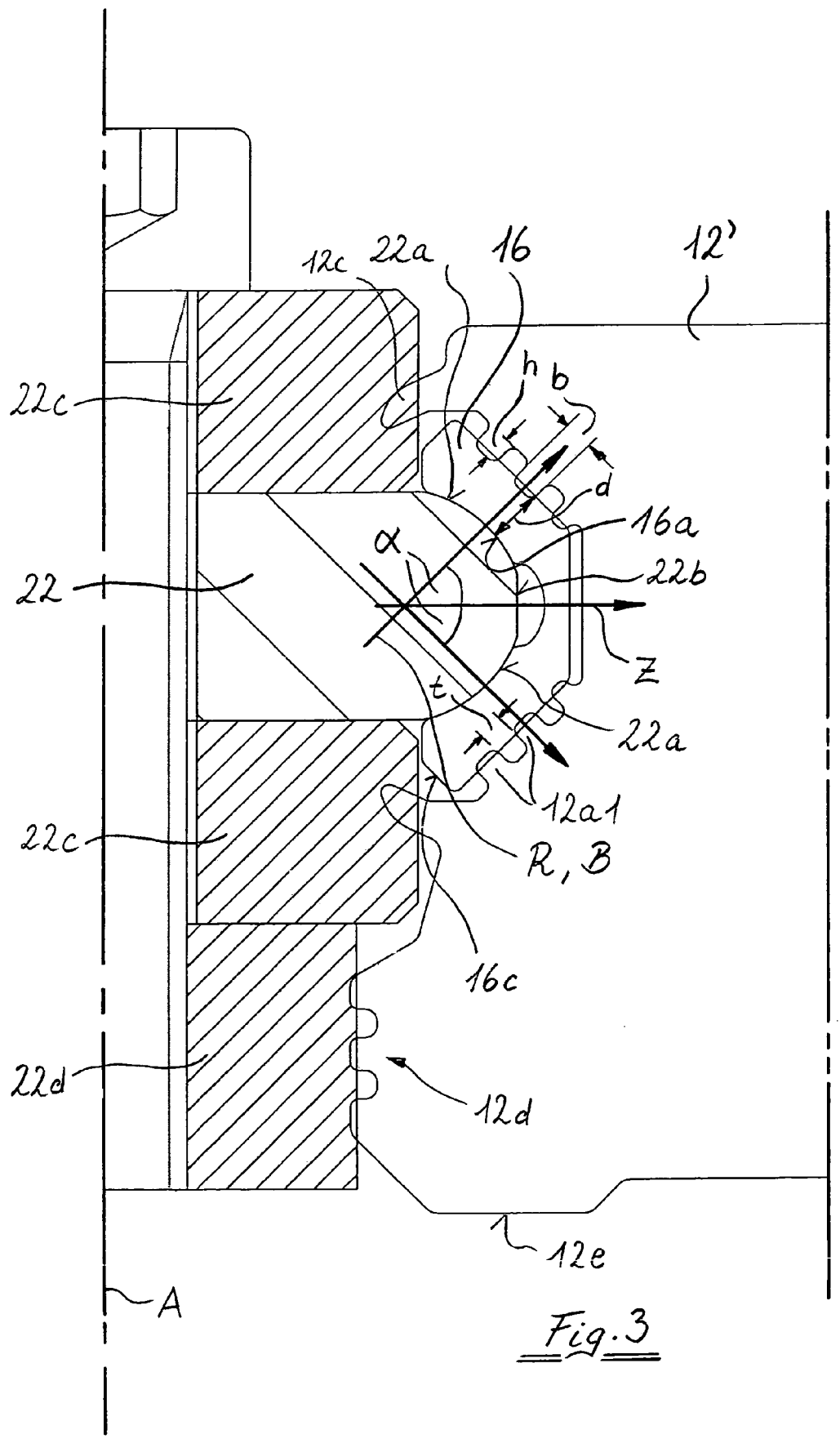
FIG. 3 gives a schematic view to facilitate explanation of the roller insertion process.

As depicted in roughly schematic fashion in FIG. 3, the running rail 16 is attached to the guide rail blank 12' by means of a roller insertion process. A roller insertion tool 22 rotating around the axis A is incrementally advanced in an advancing direction Z laterally in the direction toward the guide rail blank 12' and presses the sections of the running rail 16 equipped with the races 16a against the supporting ribs 12a1. This plastically deforms the tips of the supporting ribs 12a1, which is indicated in a roughly schematic fashion in FIG. 3 by the overlapping of the outlines of the supporting ribs 12a1 with the outline of the running rail 16. In order to prevent the supporting ribs 12a1 from bending away laterally, i.e. in the advancing direction Z, as a result of this roller insertion process, the force exerted by the roller insertion tool 22 is deflected into the protrusion direction R of the supporting ribs 12a1, which simultaneously coincides with the subsequent operating load transmission direction B. This is achieved according to the present invention by virtue of the fact that on its surface section that engages with the running rail 16, the roller insertion tool 22 is embodied with a profile that fits snugly against the races 16a of the running rail 16. Since the two races 16a in the exemplary embodiment of the linear guide unit 10 shown in FIG. 1 combine to form a Gothic arch, this profile shape is also preferable for the surface section 22a of the roller insertion tool 22. Between the two surface sections 22a, the roller insertion tool 22 also has a section 22b in which it does not act on the running rail 16.

Since the protrusion directions R of the groups of supporting ribs 12a1 associated with the two races 16a of the running rail 16 enclose the same angle α with the advancing direction Z of the roller insertion tool 22, the forces acting on the two groups of supporting ribs 12a1 yield a resulting overall force that is oriented in the advancing direction Z.

As indicated in FIG. 3 by the overlapping of the protrusions 12c of the guide rail blank 12' with the regions 22c of the roller insertion tool 22, the roller insertion tool 22 also acts on these protrusions 12c when advancing in the direction Z. This deforms the protrusions 12c in such a way that they rest against the lateral surfaces 16c of the running rail 16 (see FIG. 1). In this way, in the finished guide rail 12 (see FIG. 1), the protrusions 12c of the guide rail blank 12' constitute securing tabs that secure the running rails 16 to the guide rail 12 in a form-fitting fashion.

Finally, the roller insertion tool 22 also has a region 22d, which, when the roller insertion tool 22 is advanced in the advancing direction Z, acts on the array of ribs and channels 12d provided on the side surfaces of the guide rail blank 12', adjacent to its bottom surface 12e. In the finished guide rail 12, the deformed arrays of ribs and channels 12d thus constitute additional rolled regions that counteract a buckling of the guide rail 12 during the roller insertion of the rolling rails 16. In the placement and dimensioning of the size and number of the additional rolled regions, the only important thing is to assure that the center of gravity of the cross-sectional area deformed by the roller insertion (i.e. including the roller insertion regions associated with the running rails 16 ) essentially coincides with the center of gravity of the overall cross-sectional area of the guide rail blank 12' and the guide rail 12.

Furthermore, at least one of the additional rolled regions 12d can serve as a stopping edge with which the guide rail 12 rests against an adjusting projection 14a of the mounting plate 14. This makes it possible to assure that the guide rail 12 actually follows the desired, for example straight, path.

As indicated in FIG. 3, the roller insertion of the running rails 16, the deforming of the projections 12c, and the production of the additional rolled regions 12d can be simultaneously executed in a single work step.

In order to be able to assure a precise relative positioning of the running rails 16 in relation to the larger structural unit 14 (see FIG. 1), the guide rail 12, together with the roller-mounted running rails 16 can be held against the races 16a of the running rails 16 by means of roller elements 18, for example, and the bottom surface 12e of the guide rail 12 can be machined in a cutting fashion, for example routed out, by means of a tool (not shown) that is precisely aligned in relation to the roller elements 18.

In the dimensioning of the height h and the width b of the supporting ribs 12a1, the width t of the channels separating these supporting ribs, and the thickness d of the running rail 16 (see FIG. 3), the following should be taken into account:

When the guide carriage 20 is guided on the guide rail 12 by means of at least one endless recirculating roller element, the thickness d of the running rail 16 should lie between approximately 10% and approximately 35% of the diameter of the roller elements 18. In addition, the ratio of the sum of the widths b of the supporting ribs 12a1 that are associated with a race 16a to the diameter of the roller elements 18 should lie between approximately 30% and approximately 60%. The ratio of the sum of the widths b of the supporting ribs 12a1 that are associated with a running rail 16 to the overall width of the running rail 16 should lie between approximately 50% and approximately 70%. Finally, the ratio of the height h of a supporting rib 12a1 to the width b of the same supporting rib 12a1 should lie between approximately 0.5 and approximately 1.5. Fundamentally, it is also possible to embody the supporting ribs 12a1 with different heights h.

Along with all of these considerations, it is also important to account for the fact that the material for the guide rail 12 elastically springs back again slightly after the roller insertion force is removed. However, experience has shown that it is possible to calculate the resulting rebounding spring path ahead of time with a sufficient degree of precision based on the known mechanical properties of the material of the guide rail 12 and the known forces acting on the guide rail 12 during the roller insertion process. Moreover, after the roller insertion process, the bottom surface 12e of the guide rail 12, as described above, undergoes additional cutting machining for which the races 16a of the running rails 16 serve as a reference.

It should also be noted that each race 16a of the running rails 16 is associated with an odd number of supporting ribs 12a1. This makes it easy to assure that the operating load transmission line B extends from the running rail 16 directly through one of the supporting ribs 12a1, preferably the center supporting rib. This assures a particularly rigid support of the race 16a.

The following should also be noted: since the running rails 16 no longer undergo a cutting machining after the cold forming, care must be taken to keep the surface of the raw material free of impurities. Otherwise, at least part of these impurities would end up on the race surface after the cold forming, which would reduce their longevity. As is known from the prior art, the manufacture of the running rails according to the present invention also includes a peeling away of the raw material before the cold forming, i.e. the outermost surface that is contaminated with metal scale is removed in a cutting fashion, for example by means of milling or turning.

After the running rails 16 have then been transformed into the desired shape by means of a forming process, they must then be hardened, which is usually associated with a powerful heat treatment. Since there is the danger here that the surface of the running rail will oxidize, develop scale, or the like, which would require an additional cutting machining for cleaning purposes, the running rails used according to the present invention are hardened in a vacuum so that the powerful heat treatment does not damage the races.

Finally, it should also be noted that the running rails 16 can be secured to the guide rail 12 in the axial direction, i.e. in the longitudinal direction L of the guide rail 12, by means of gluing, by means of end caps mounted onto the ends of the guide rail 12, or by means of form-fitting engagement in order to prevent undesired slippage. The form-fitting engagement can, for example, be obtained by providing a multitude of notches in the longitudinal edges of the running rails 16 and by roller inserting the securing tabs 12c into these notches.

In practice, the guide rails 12 can be embodied in accordance with the size of the linear guide unit 10, as summarized by way of example in the following table:

| size G of the guide rail [mm] | ball diameter D [mm] | width w of the steel insert [mm] | overall width of the ribs [mm] | surface quality Rz [μm] | number of ribs | thickness d of the steel insert [mm] | snugness of fit |
|---|---|---|---|---|---|---|---|
| 15 | 3.500 | 2.325 | 1.6 | 0.8 | 3 | 0.75 | 0.58 |
| 20 | 5.000 | 3.325 | 1.9 | 0.6 | 3 | 1.20 | 0.56 |
| 25 | 5.556 | 3.585 | 1.9 | 0.4 | 3 | 1.35 | 0.55 |
| 30 | 6.500 | 4.315 | 2.5 | 0.3 | 5 | 1.50 | 0.54 |
| 35 | 8.000 | 5.225 | 3.4 | 0.1 | 5 | 1.85 | 0.53 |

The size G of the guide rail 12 relates to the width of the base section with which the guide rail 12 rests on the larger mounting unit 14 (see FIG. 1). The width w of the running rail 16 is understood to be the width with regard to a race 16a, and the number and overall width of the ribs relates to one of the races 16a of the running rail 16. Snugness of fit is understood to mean the ratio of the radius of the race 16a to the radius of the surface of the roller insertion tool 22 and/or the roller element 18.

The invention claimed is:

1. A linear guide unit (10), having a guide rail (12) extending in a longitudinal direction (L) and a guide carriage (20) that is guided in the longitudinal direction (L) on the guide rail (12);
  at least one running rail (16) is provided on the guide rail (12); and
  the at least one running rail (16) has at least two races (16a) that have different load transmission directions (B) and are separated from each other by a load-free surface section (16b), wherein
  the guide rail (12) is comprised of a softer material and the running rail (16) is comprised of a harder material and the running rail (16) is attached to the guide rail (12) by means of rolling element insertion;
  in the surface sections (12a) associated with the races (16a) of the running rail (16), the guide rail (12) is provided with a plurality of supporting ribs (12a1); and
  the supporting ribs (12a1) associated with one and the same race (16a) are aligned essentially parallel to the load transmission direction (B) of this race (16a).

2. The linear guide unit as recited in claim 1, wherein the running rail (16) is supported against the guide rail (12) only in the sections associated with the races (16a).

3. The linear guide unit as recited in claim 1, wherein a race (16a) of a running rail (16) is associated with an odd number of supporting ribs (12a1).

4. The linear guide unit as recited in claim 3, wherein the operating load transmission line (B) extends through the center supporting rib (12a1).

5. The linear guide unit as recited in claim 3, wherein the center supporting rib (12a1) is embodied as wider than the supporting ribs (12a1) adjacent to it.

6. The linear guide unit as recited in claim 1, wherein the running rail (16) is manufactured out of a cold-formed material.

7. The linear guide unit as recited in claim 1, wherein at least two races (16a) combine to form a Gothic arch.

8. The linear guide unit as recited in claim 1, wherein the running rail (16) is secured to the guide rail (12) by means of at least one tab (12c) provided on the guide rail (12).

9. The linear guide unit as recited in claim 1, wherein the guide rail (12) is an extrusion molded profile material material selected from the group consisting of light metal and a light metal alloy.

10. The linear guide unit as recited in claim 1, wherein the guide rail (12) has at least one additional rolled section in a region (12*d*) distant from the at least one running rail (16).

11. The linear guide unit as recited in claim 10, wherein the center of gravity of the deformed cross-sectional area (12*a*, 12*d*) of the guide rail (12) essentially coincides with the center of gravity of the overall cross-sectional area of the guide rail (12).

12. The linear guide unit as recited in claim 1, wherein when the guide carriage (20) is guided on the guide rail (12) by means of at least one endless recirculating rolling element, the thickness (d) of the running rail (16) is between approximately 10% and approximately 35% of the diameter of the rolling element (18).

13. The linear guide unit as recited in claim 1, wherein the ratio of the sum of the widths (b) of the supporting ribs (12*a*1) associated with a running rail (16) to the overall width of the running rail (16) lies between approximately 50% and approximately 70%.

14. The linear guide unit as recited in claim 1, wherein when the guide carriage (20) is guided on the guide rail (12) by means of at least one endless recirculating rolling element, the ratio of the sum of the widths (b) of the supporting ribs (12*a*1) associated with a race (16*a*) to the diameter of the rolling elements (18) lies between approximately 30% and approximately 60%.

15. The linear guide unit as recited in claim 1, wherein the ratio of the height (h) of a supporting rib (12*a*1) to the width (B) of the same supporting rib (12*a*1) lies between approximately 0.5 and approximately 1.5.

* * * * *